United States Patent [19]

Schoonman

[11] 4,004,538

[45] Jan. 25, 1977

[54] WAVE RESPONSIVE HATCH COVER LOCKING AND SEALING MECHANISM

[76] Inventor: Marten Leonard Schoonman, 906 N. Elam Ave., Greensboro, N.C. 27408

[22] Filed: Mar. 19, 1976

[21] Appl. No.: 668,381

[52] U.S. Cl. .......................................... 114/201 R
[51] Int. Cl.² ........................................ B63B 19/12
[58] Field of Search ... 114/201 R, 201 A, 117–119, 114/.5 R, 16 R; 49/160, 477; 220/225, 232

[56] References Cited

UNITED STATES PATENTS

| | | | |
|---|---|---|---|
| 1,806,859 | 5/1931 | Mattei | 114/117 |
| 2,551,750 | 5/1951 | Liskey, Jr. | 114/201 A |
| 3,124,852 | 3/1964 | Holderer | 114/201 A |
| 3,897,743 | 8/1975 | Schoonman | 114/16 R |

Primary Examiner—Trygve M. Blix
Assistant Examiner—Jesus D. Sotelo
Attorney, Agent, or Firm—Sughrue, Rothwell, Mion, Zinn & Macpeak

[57] ABSTRACT

Wave impact closes normally open contacts on a marine vessel hatch cover face to initiate or to increase fluid pressure within a collapsible hollow gasket interposed at the interface between a hatch cover and a deck hatchway to lock the hatch cover to the hatchway and to effect a watertight seal therebetween.

6 Claims, 3 Drawing Figures

FIG 1
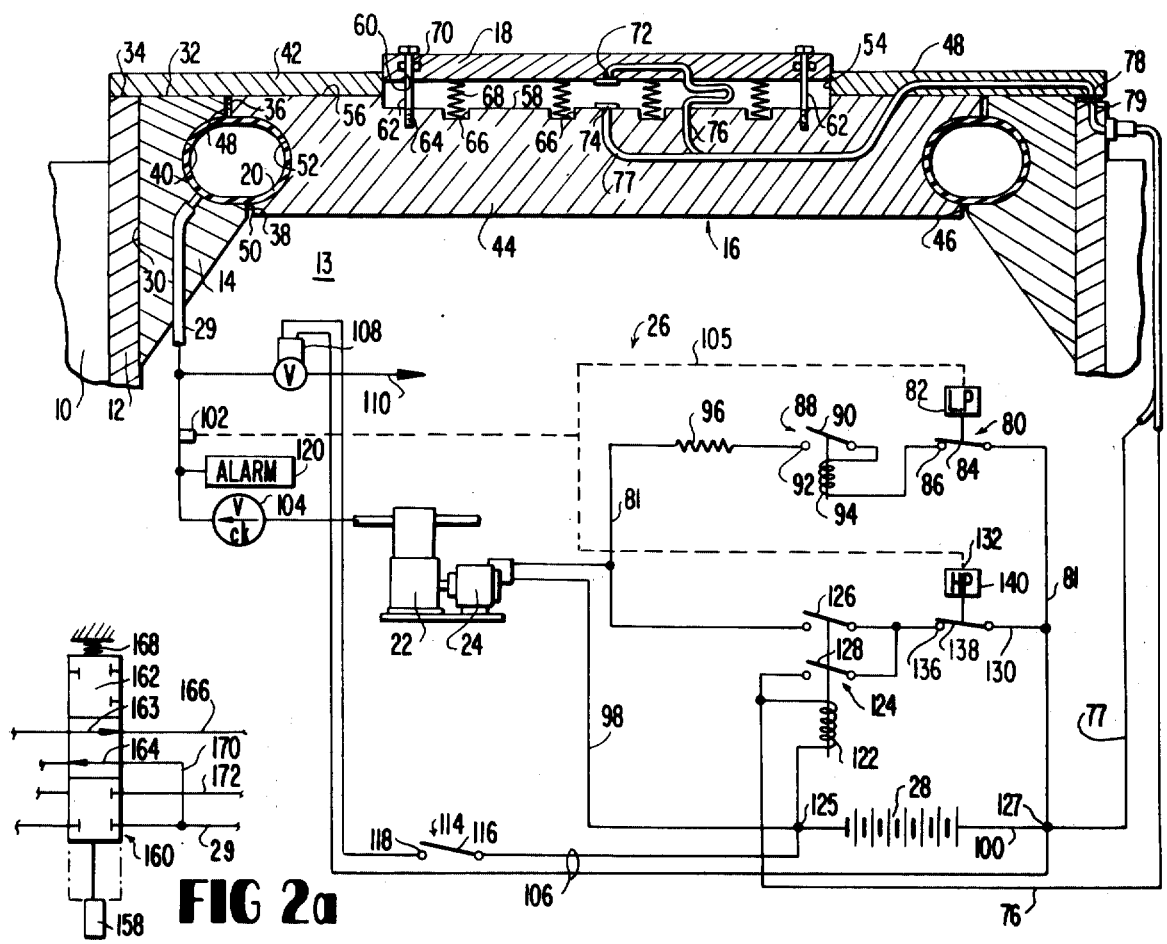
FIG 2a
FIG 2
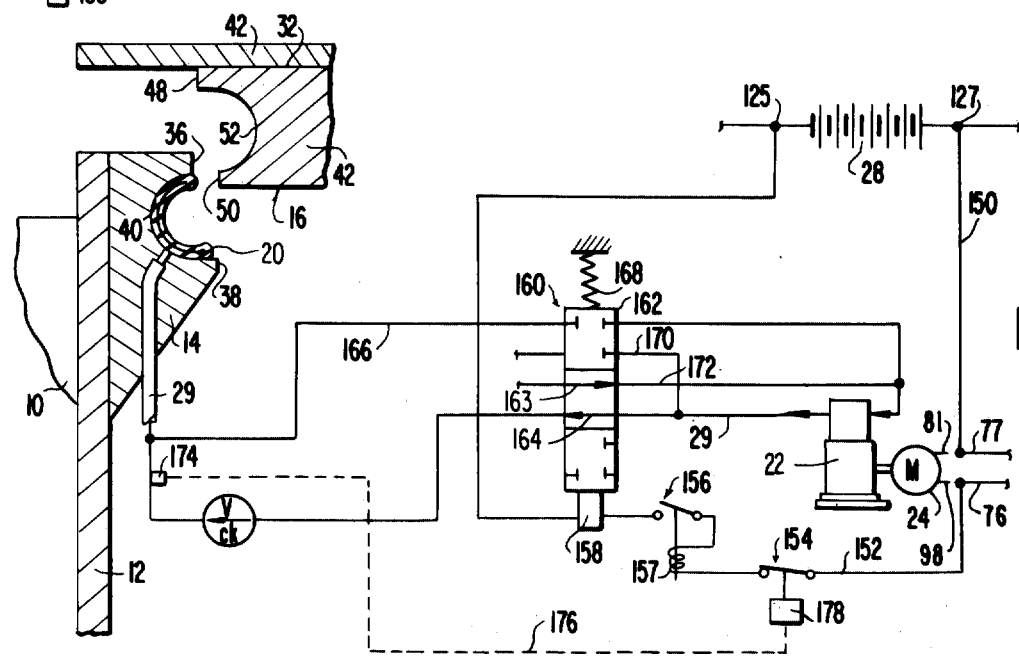

WAVE RESPONSIVE HATCH COVER LOCKING AND SEALING MECHANISM

BACKGROUND OF THE INVENTION

1. Field of the Invention

This invention relates to marine cargo vessels and more particularly to a system for selective pressurization of an expandable hollow gasket interposed between a hatchway defining an opening within the deck for access to a cargo storage compartment within the vessel interior and a hatch cover interfittingly mounted on the hatchway and closing off the opening.

2. Description Of The Prior Art

Marine vessels such as cargo ships and the like store massive amounts of cargo within the marine vessel hull in cargo compartments normally separated by laterally directed, longitudinally spaced bulkheads. Access to the cargo storage compartments is normally achieved through hatchways forming circular or rectangular openings within the deck of the vessel, these hatchway openings normally being covered by removable hatch covers of corresponding configuration having a projecting portion which fits within the hatchway opening.

Conventionally, the periphery of the hatch cover is extended beyond the hatchway opening, and the hatch cover may be hinged to the hatchway member or simply held in place by gravity force.

Conventional hatch covers are somewhat loosely maintained on the hatchway member and as a result during adverse weather, with waves crashing over the deck, sea water seeps between the hatch cover and the hatchway member and into the cargo compartment.

The applicant, in U.S. Pat. No. 3,897,743 entitled "Multi-hull Convertible Cargo Carrier Submarine" issuing Aug. 5, 1975, discloses an arrangement for sealing and locking of a plurality of hatches to a marine cargo hull (of a submersible type) in which the portion of the hull forming the hatchway or hull opening carries, in this case, hinged hatches or hatch covers. Around the complete edge thereof, a seal and locking groove is provided, characterized by a cross section whose entry portion is of a smaller width than the portion of the groove internally thereof. Further provided about the periphery of the hinged hatch cover, on its lower face, is an expandable hollow sealing and locking gasket. By subjecting the gasket to compressed air or hydraulic liquid under pressure, the gasket expands to fill the groove and to effect both a lock and a waterproof seal for the hatch cover.

It is an object of the present invention to provide an improvement in such a combined lock and sealing mechanism in terms of a control system for controlling the pressurization and thereby the initiation and termination of the lock and seal for the hatch cover and for either initiating or increasing the fluid pressure application to the deformable, expandable gasket in response to the hatch cover wave impact during adverse weather and rough seas.

It is a further object of the present invention to provide an improved combined hatch cover locking and sealing mechanism of this type which may be incorporated within an existing marine vessel by simple modification of the hatch cover and hatchway defining the deck opening for receiving the hatch cover.

SUMMARY OF THE INVENTION

The present invention has application to marine cargo vessels or the like of the type having a deck extending horizontally across the vessel hull and defining with that hull at least one cargo storage compartment, and wherein a hatchway member within the deck defines a cargo access opening and a hatch cover member overlies said hatchway member opening and includes a portion in surface interfacing position relative to an opposed surface of the hatchway. A hollow, inflatable gasket carried by one of the members faces the other member at said interface, and a recess within the other member interface portion receives a portion of the gasket when inflated. Fluid pressure means is provided for inflating the gasket to force a portion of the gasket into the recess and to seal and lock the members together at the interface. The improvement comprises means carried by the hatch cover sensitive to wave action for controlling pressurization of the gasket.

Preferably, the hatch cover member wave action sensing means comprises normally open switch contacts and circuit means includes the switch contacts, a voltage source, and a pump drive motor, and a pump driven by the motor fluid coupled to the gasket, such that closure of the normally open switch contacts energizes the motor to drive the pump and pressurize the gasket.

In one form, the control circuit includes a first circuit path from the voltage source including a normally open manually operated switch, an electrical resistance element for low speed operation of the motor and pressurization of the gasket at a relatively low pressure. A parallel, second circuit path of low resistance comprises a short circuit path to the first circuit path and includes the normally open contacts of the switch means responsive to wave action for supplying a relatively high current to the motor, increasing the pump drive motor speed and increasing the fluid pressure within the gasket. A check valve may be incorporated in the conduit between the pump and the gasket to prevent gasket depressurization upon de-energization of the pump drive motor. Holding relays may be provided for the switches within both the high resistance or the low resistance circuit paths between the voltage source and the pump drive motor for maintaining current flow to the motor after opening of the switch contacts. Normally closed pressure responsive switches may be further employed in each circuit path for opening of the circuit path connection between the voltage source and the motor after proper pressurization of the gasket. A normally closed, solenoid operated valve within a bleed line, and responsive to closure of the contacts of a normally open hatch cover unlatching switch, selectively bleeds the gasket, permitting hatch cover removal.

The control circuit may further employ a solenoid operated two position spool valve for selectively fluid coupling the pressure and suction sides of the pump to the gasket to effect a vacuum collapse of the expandable gasket to instantly release the hatch cover member and terminate the seal.

BRIEF DESCRIPTION OF THE DRAWINGS

FIG. 1 is a sectional view and schematic circuit diagram of the improved wave responsive hatch cover locking and sealing system of the present invention.

FIG. 2 is a sectional view and schematic circuit diagram of a portion of the hatch cover of FIG. 1 in modified form.

FIG. 2a is a schematic diagram of the two position solenoid operated valve of the embodiment of FIG. 2 under energization.

Like elements in the various figures carry like numerical designations.

DESCRIPTION OF THE PREFERRED EMBODIMENTS

The present application has particular application to conventional marine cargo carriers, and in that respect, a horizontal deck plate 10 of a marine cargo vessel (otherwise not shown) is provided with a cylindrical hatchway or member 12 which may be welded thereto and extends therethrough to define a cylindrical cargo compartment access or hatchway opening 13 within the deck permitting access to a cargo compartment underlying deck 10. The cylindrical hatchway member 12 rises slightly above the deck 10. Obviously, the hatch openings and hatch cover may be cylindrical or rectangular in plan configuration, the invention having applicability to all conventional hatchway and hatch cover configurations. Further, the invention has application to modification of existing hatchway opening and hatch cover arrangements. In the illustrated embodiments, an annular converter ring 14 which is formed of metal or the like is welded or otherwise attached at its outer periphery 30 to the interior of the hatchway member 12. In terms of the type of combined seal and locking mechanism of U.S. Pat. No. 3,897,743, the mechanism involves a hatch cover or member indicated generally at 16, modified by way of a wave sensor plate 18, a control and pressurized fluid supply circuit indicated at 26 including a voltage source 28 which selectively energizes a pump drive motor 24 for pump 22 which pressurizes an inflatable hollow gasket 20 through a pressurized fluid supply conduit 29.

With these basic components in mind, it is noted that the converter ring 14 has its upper end 32 flush with the end 34 of the hatchway member 12. The inner peripheral edge of the converter ring is stepped so as to provide radially offset, vertical edges 36 and 38 at the top and bottom of the ring with an annular recess 40 formed between the stepped vertical edges 36 and 38. The hatch cover or member 16 comprises a flat circular plate 42 whose periphery is the same diameter as the outer diameter of member 12. The hatch cover or member 16 is provided on its lower face with a reduced diameter section 44 which interfits within the opening 46 defined by the converter ring 14. The peripheral edge of hatch cover section 14 is oppositely stepped to that of ring 14 and includes an upper radially projecting enlarged edge portion 48 and a stepped relatively radially reduced edge portion 50 joined by annular recess 52 having a radius of curvature corresponding to that of recess 40 within the converter ring and facing the same. The recesses 40 and 52 form an annular cavity when the hatch cover 16 is seated on the hatchway member 12 which is slightly elongated in cross section. However, the annular cavity formed by the cooperating recesses of 40 and 52 within respective members may take various shapes such as that within U.S. Pat. No. 3,897,743 or may form a perfect circle. Preferably, the facing sidewalls of the converter ring and the hatch cover section 44 are stepped in the manner shown to facilitate the seating of the hatch cover onto the hatchway member 12 and the removal of the same unimpeded by the presence of the annular inflatable, expandable gasket 20. Gasket 20, which is of a size corresponding essentially to the size of the annular cavity formed by the cooperating recesses 40 and 52 within members 14 and 16 is preferably fixedly mounted to the converter ring 14 which is considered to be a part of the hatchway opening defining structure of the vessel or ship proper. However, the gasket may in fact be fixed to the hatch cover or member 16, in which case, fluid connections would have to be made to the gasket through the removable hatch cover 16 rather than through the converter ring or hatchway member 12.

In the illustrated embodiment, the gasket 40 may comprise neoprene, rubber, reinforced fluid proof fabric material, or the like material. The gasket of the illustrated embodiment may be likened to an inner tube which when inflated takes the form shown in FIG. 1, and when collapsed, preferably takes the form of FIG. 2 although collapse and withdrawal into recess 40 is not absolutely necessary although it facilitates removal of the hatch cover once the hatch cover is unlatched and the seal is broken.

By further reference to FIG. 1, it is seen that the top 48 of hatch cover plate 42 is cut out at its center at 54 to receive sensor wave plate 18. The wave plate is preferably circular in configuration and mounted for limited movement within opening 54 and may be created by cutting through plate 42 to form that member 18. The wave plate is formed separate from plate 42, but supported for movement relative to that plate. The upper surface 56 of the hatch cover section 44 is centrally recessed as at 58 to the extent of opening 54, the wave plate is provided with drilled holes 60 at circumferentially spaced positions through which pass threaded screws 62 which are threadedly received at 64 within the hatch cover section 44 within the recess 58. Localized depressions as at 66 within cover section 44 individually carry coil springs 68 which bear on the lower surface of the wave sensor plate 18, are compressed therebetween and bias the plate 18 away from the hatch cover section 44. The wave sensor plate 18 slides on the screws 62 to the extent permitted by their headed ends, preferably sealed at 70, within the wave sensor plate, to prevent water from wave impact to enter the cavity between the wave sensor plate 18 and hatch cover section 44. Further, if necessary, an annular seal (not shown) may be carried within hatch cover plate 42 at the opening 54 to contact the periphery of the wave sensor plate 18 and to further prevent water from entering the cavity between the wave sensor plate 18 and section 44 of the hatch cover 16. Water pressure provides the means for effecting closure of switch contacts 72 and 74 to insure fluid pressure sealing and locking of the hatch cover to the hatchway.

The wave sensor plate constitutes one means for sensing waves moving across the deck and impacting the hatchway and hatch cover. In that respect, the wave sensor plate 18 carries a first switch contact 72 opposite contact 74 mounted on hatch cover section 44 within the recess 58. The contacts 72 and 74 are normally open as long as the wave sensor plate 18 is spring biased away from contact with hatch cover section 44. Insulated electrical leads 76, 77 extend from contacts 72, 74 respectively through the hatch cover and terminate at contacts 78 adjacent the periphery of hatch cover plate 42. Underlying contacts 79 carried by the hatchway member 12 further extend leads 76 and 77 to other components of the electrical control circuit indicated generally at 26. In the preferred arrangement of FIG. 1, a first circuit path comprises line 81 which leads to one side of a normally closed switch low pressure responsive switch indicated generally at 80 including a pressure sensor 82, a normally closed movable contact 84 and a fixed contact 86. Connected in series with the low pressure switch 80 is a normally open low pressure, manually operable actuator switch generally indicated at 88 including a movable contact 90, a fixed contact 92 and a holding coil 94. In series with the actuator switch 88, is an electrical resistance element 96, line 81 leading to the electric pump drive motor 24. A return line 98 leads to the voltage source 28 consisting in the illustrated embodiment of a battery whose opposite side is connected by line 100.

In the illustrated embodiment of FIG. 1, the initial low pressure pressurization of gasket is achieved by manually closing the actuator switch 88 such that the normally open switch contacts close, this switch being a push button switch or the like. The holding coil maintains contacts 90 and 92 closed upon release of the push button by the operator. However, the motor 24 continues to operate at low current through the resistance 96 to the extent of low pressure pressurization of the gasket 20 and creation of an initial seal and lock for the hatch cover 16. In that respect, supply conduit 29 includes a tap as at 102 upstream of a check valve 104 such that the pressure within line 29 is sensed by pressure sensor 82 at the end of sensor conduit 105, this causing the normally closed switch contacts 84 and 86 of switch 80 to open and thereby de-energizing the pump drive motor 24 and the holding coil 94. The check valve 104 prevents depressurization of supply conduit or line 29 between that check valve and gasket 20 as well as the gasket and maintains the combined seal and lock.

In the illustrated embodiment, an unlock circuit is set up by lines 106 between source 28 and a solenoid pressure release valve 108 positioned within vent conduit or line 110 which emanates from line 29 between the gasket 20 and check valve 104. This permits depressurization of the line 29 and the gasket 20 upon closure of a manually operated hatch cover unlatching switch 114. Switch 114 may be a push button operated switch in which depression of the push button causes normally open movable contact 116 to close on fixed contact 118, energizing the solenoid valve 108 opening vent conduit 110 to the atmosphere and depressurizing gasket 20. Further, a low pressure alarm indicated schematically by box 120 is fluid coupled to line 29 downstream of the check valve 104 to produce a signal at a control panel within the ship's bridge (not shown) indicative of a lack of pressurization for a gasket such as gasket 20 associated with the illustrated hatch cover. The alarm 120 may take the form of a light which is illuminated in response to a loss of pressure within gasket 20, either inadvertently or under in response to selective operation of the hatch cover unlatching switch 114.

An important aspect of the present invention lies in the utilization of the wave sensor plate 18 and its movable contact 72 as a means for effecting increased pressurization of gasket 20 for more securely locking the hatch cover 16 to the hatchway member 12 through the converter ring 14 and increasing the sealing pressure provided by the gasket on annular recess 52 within the hatch cover section 44. In that regard, the impact of a wave on the wave sensor plate causes the compression springs 68 to be further compressed and momentary or sustained closure of contacts 72 and 74. A circuit is completed through line 76, coil 122 of holding relay 124, battery connection point 125, battery 28, and line 77 via connection point 127. Energization of coil 122 closes a pair of normally open switch contacts as at 126 and 128. This completes a circuit to motor 24 through a second current path via line 130, a pressure operated normally closed switch indicated generally at 132, and switch contacts 126. However, line 130 comprises a low resistance path comparable to line 81 which includes resistance 96 such that line 130 acts as a short circuit path between the voltage source or battery 28 and the pump drive motor 24 causing the motor to rotate at a higher speed and causing the pump 22 associated therewith to discharge fluid at a higher pressure into line 29 leading to the gasket 20. Pump 20 may comprise an air compressor. Thus, the fluid pressure within the gasket 20 increases to a level insuring that the seal between and the lock for the hatch cover 16 will remain unbroken regardless of the impact of waves thereon and the rolling of the ship during storm conditions.

Regardless of whether the contacts 72 and 74 remain closed, holding relay coil 122 maintains normally open contacts 126 and 128 closed, thus maintaining a circuit through line 81, line 130 and line 98, normally open contacts 128 which are closed and the coil 122 to the opposite side of the battery via connection point 125. A high current from the voltage source 28 continues to flow to the pump motor until fluid pressure within the gasket 20 and within line 29 reaches a predetermined value as sensed by pressure switch 132. The pressure switch 132 includes a fixed contact 136, a movable contact 138 and a pressure sensor 140. The pressure sensor 140 moves contact 138 away from the fixed contact 136 to open the circuit to the holding relay coil 122 and to the pump drive motor 24. Pressurization of gasket 20 at the high pressure level is maintained because of the presence of check valve 104 within line 29 downstream of the pump 22. To release the hatch cover, closure of normally open switch contacts 116, 118 of the hatch cover unlatching switch 114 by depression of the push button (not shown) causes the solenoid valve 108 to open venting the fluid pressure within gasket 20 via vent line 110.

In order to insure that the gasket 20 after depressurization will not impede the removal of the hatch cover 16, it may be preferable to connect the pump 22 and drive motor 24 such that the pump may selectively operate to supply fluid under positive pressure to gasket 20 or apply vacuum pressure thereto. Such an arrangement is illustrated in the embodiment of FIG. 2, which shows only that portion of the circuitry which has been modified to the extent of incorporation of an additional electrical circuit portion for controlling a solenoid operated spool valve 160 positioned within the flow line 29 leading from the motor driven pump 22 to the gasket 20. In that respect, line 150 extends from connection point 127 common to the circuit of FIG. 1 and connects with line 77 to the drive motor 24. Further, line 152 connects with line 76 leading from that pump motor and connects in series with the drive motor 24, a normally closed vacuum pressure operated switch 154, a manually operated, normally open vacuum initiation switch 156, and solenoid coil 158 of solenoid operated spool valve 160. Line 152 returns to the opposite side of the voltage source or battery 28 at connection point 125. The solenoid operated valve 160 comprises a spring biased valve spool 162 which includes flow through passages 163 and 164. In addition to supply conduit 29 leading from the pump 22 to the gasket 20, the fluid circuit additionally includes a vacuum supply conduit 166 which fluid connects conduit 29 downstream at a point between the check valve 104 and the gasket 20 to the suction side of the pump 22. The solenoid operated valve 160 carries a compression coil spring 168 which spring biases the spool 162 to the position shown in FIG. 2 absent energization of the solenoid coil 158. Additional conduits 170 and 172 constitute vent and suction lines respectively depending upon the position of the solenoid operated valve spool 162.

Under the modified arrangement shown in FIGS. 2 and 2a, under normal operation, as seen in FIG. 1, energization of the drive motor 24 through lines 76 and 98 results in fluid under pressure being applied by pump 22 through line 29 to the gasket 20 to expand the same into the configuration shown in FIG. 1 to lock the hatch cover and to form an effective watertight seal to the hatchway member 12 through the converter ring 14. However, by use of the control scheme of FIGS. 2 and 2a, the manual movement of the movable switch contact of switch 156 to complete a circuit through lines 150 and 152 to the voltage source 28, causes the solenoid coil 158 to be energized forcing the valve spool 162 upwardly against the bias of coil spring 168. This changes the connection of pump 22 in terms of discharge line 29 and suction line 172 shown in FIG. 2 to that of FIG. 2a. Line 29 is blocked at the solenoid valve 150 and fluid connection is made to the suction side of the pump 22 through conduit 166 which leads to conduit 29 between the check valve 104 and the gasket 20. Upon closure of the switch contacts of switch 156, hold coil 157 of the switch is energized maintaining the switch contacts closed. Further, by way of the tap 174 and conduit 176, the vacuum pressure within line 29 as result of the suction connection to the pump 22, is sensed by vacuum pressure sensor 178 forming an element of the pressure operated switch 154, a vacuum of sufficient magnitude acting to open the normally closed contacts of pressure operated switch 154 to terminate energization of the motor 24 through the auxiliary circuit defined by lines 150 and 152. Further, with holding coil 157 de-energized and the switch contacts of switch 156 open, the valve spool 162 of solenoid operated valve 160 returns to the position shown in FIG. 2, since the solenoid coil 158 is de-energized upon opening of switches 154 and 156. The mechanism essentially returns to the condition shown in FIG. 1 as well as FIG. 2 prior to re-energization of the pump drive motor 24.

In the illustrated embodiments, it may be appreciated that the annular gasket 20 may be of expandable but relatively rigid construction, that is, even upon a loss of pressurized fluid by de-energization of the pump drive motor 24, the gasket may retain its expanded configuration and act both as a seal and as a light pressure locking mechanism for the hatch cover 16. Under such circumstances, the mere act of placement of the hatch cover 16 in the position shown in FIG. 1 will effect that type of seal without the necessity of energization of the pump drive motor 24. This may be sufficient for a vessel operating under pleasant weather conditions at sea. However, in a minimal sense, the pump and motor combined with the portion of the circuit covering the high pressure energization of that motor in response to depression of the wave sensor plate 18 or its equivalent to close contacts 72 and 74, is incorporated to effect positive relatively high pressure sealing and locking through gasket 20 of the hatch cover 18 to the hatchway member 12 and its converter ring 14. Preferably, however, two levels of pressure application to gasket 20 are employed to insure positive pressure expansion of the gasket 20 and positive high pressure locking and sealing of the hatch cover to the hatchway member. Where the gasket does not compress upon itself into the configuration shown in FIG. 2, as a result of mere depressurization of the same, the offsetting of the peripheral portions of the hatch cover section 44 and the peripherally facing converter ring edges 36, 38 permit the removal of the hatch cover momentarily deflecting portions of the gasket 20 and accomplishing this end. Further, as evidenced in FIG. 2, the application of vacuum pressure to the interior of the gasket 20 causes vacuum pressure deformation and fold back of one portion of the gasket on the other within the annular recess 40 of the converter ring to permit unimpeded removal of the hatch cover from the hatchway member 12.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a marine cargo vessel or the like having a deck extending horizontally across the hull of the vessel and defining with the hull at least one cargo storage compartment, a hatchway member within said deck forming a cargo compartment access opening, a hatch member overlying said cargo compartment access opening. and having a surface portion opposing a surface portion of said hatchway member and defining an interface therebetween, a hollow inflatable gasket carried by one of said members on said surface and facing the opposing surface of said other member, a recess within said opposing surface of said other member, and means for fluid pressurizing said gasket to cause a portion of said gasket upon inflation to position itself within said recess and to seal and lock said members together at said interface, the improvement comprising: means carried by said hatch cover responsive to water pressure for actuating said fluid pressurizing means, and wherein said hatch cover water pressure means for operating said fluid pressurizing means comprises wave sensor switch means and said means for fluid pressurizing said gasket comprises a pump, a first conduit fluid connecting said pump to said gasket, a drive motor mechanically coupled to said pump, a voltage source and circuit means connecting said voltage source, said motor and said switch means in series.

2. The vessel as claimed in claim 1, wherein said circuit means further comprises a first current path including a normally closed pressure switch and normally open holding relay in series between said wave sensor switch means and said pump drive motor, a check valve is positioned within said first conduit intermediate of said pump and said gasket, and a second pressure sensing conduit is fluid connected to said first conduit between said gasket and said check valve and to said pressure switch such that momentary closure of said wave sensor switch means causes energization of said holding relay coil to close the normally open switch contacts thereof to maintain energization of said pump motor to cause pressurization of said gasket, and wherein the increase of pressure within said gasket and said conduit sensed by said pressure switch causes said normally closed switch contacts thereof to open to discontinue energization of said pump drive motor while said check valve maintains pressurization of said gasket.

3. The vessel as claimed in claim 2, further comprising: a vent line fluid connected to said first conduit between said check valve and said gasket, a normally closed solenoid operated valve within said vent line, means including a normally open hatch cover unlatching switch connecting said solenoid vent valve across said voltage source; whereby, closure of said hatch cover unlatching switch energizes said solenoid valve to vent said conduit means and said gasket to effect selected depressurization of said gasket and release of said lock and sealing means.

4. The vessel as claimed in claim 3, wherein said circuit means further comprises: a second current path in parallel to said first current path, said second path includes in series a normally closed pressure switch, a normally open actuator switch, a holding coil for said normally open actuator switch and an electrical resistance element between said voltage source and said pump drive motor, such that regardless of energization of said drive motor through said wave sensor means, manual operation of said actuator switch causes a relatively low current to flow to said pump motor to operate said pump to effect pressurization of said gasket at relatively low pressure, said holding coil of said manually operated actuator switch maintains the normally open switch contacts closed upon termination of manually closed actuator switch, and said pressure operated normally closed switch is fluid connected to said pressure sensing line between said check valve and said gasket to effect opening of said normally closed contacts and termination of drive motor energization in response to pressurization of said gasket at said reduced pressure level.

5. The vessel as claimed in claim 4, further comprising: a two position solenoid operated spool valve positioned within said first conduit, said vessel further comprises suction conduit means fluid coupled at one end to said first conduit means intermediate of said check valve and said gasket and fluid coupled at the other end to the suction side of said pump, said solenoid operated spool valve also being interposed within said suction conduit, said spool valve including a valve spool shiftable between two extreme positions, in a first position said pump discharge is connected to said first conduit and in the second of which, said suction conduit is connected from the suction side of said pump to said first conduit, means spring biasing said solenoid valve normally to said first position, a solenoid coil operatively associated with said valve spool for shifting said valve spool to said second position in response to energization thereof, and an auxiliary circuit including said voltage source, a normally open manually operated suction switch and said solenoid coil; whereby, selective energization of said solenoid valve coil fluid couples said gasket to the suction side of said pump for suction deflating of said gasket.

6. The vessel as claimed in claim 5, wherein said auxiliary circuit includes a holding coil for maintaining the switch contacts of said suction switch closed upon manual closure of said switch and energization of said solenoid, and a pressure operated normally closed switch series connected within said auxiliary circuit means and responsive to a predetermined vacuum pressure within said conduit means and said gasket for opening said normally closed contacts to de-energize said spool valve solenoid reconnecting said first conduit means and said gasket to the discharge side of said pump.

* * * * *